Patented Sept. 1, 1942  2,294,380

UNITED STATES PATENT OFFICE 2,294,380

AZO COMPOUND

William Braker, Brooklyn, N. Y., assignor to E. R. Squibb & Sons, New York, N. Y., a corporation of New York No Drawing. Application December 23, 1939, Serial No. 310,829

9 Claims. (Cl. 260—156)

This invention relates to, and has for its object the provision of: I, azo bases of the general formula

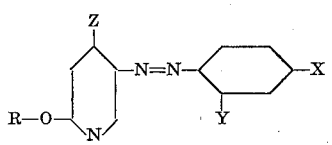

wherein R represents alkyl, preferably lower alkyl, X represents hydroxy or (preferably) amino, Y represents hydrogen, hydroxy, alkyl, aryl, alkoxy, or (preferably) amino, and Z represents hydrogen or halogen; II, acid-addition salts of these azo bases; III, novel intermediates, of the formula

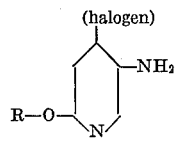

wherein R has the meaning given hereinbefore, for preparation of some of these azo compounds; and IV, a process for the preparation of these intermediates.

These azo compounds are promising chemotherapeutic agents for the treatment of pyelitis, urethritis, prostatitis, cystitis, and other acute and chronic infections of the genito-urinary tract. The acid-addition salts of the azo bases are water-soluble, and may be administered orally.

The azo bases may be prepared by diazotizing an amine of the general formula

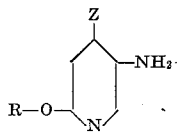

wherein R and Z have the meanings given hereinbefore, and coupling the diazonium salt obtained with a compound of the general formula

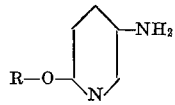

wherein X and Y have the meanings given hereinbefore—inter alia, m-phenylene-diamine, m-phenetidine, m-cresol, aniline, phenol, resorcinol, m-phenyl-phenol, and m-toluidine. The resulting azo bases may be converted into acid-addition salts by reacting the base with the appropriate acid in a solvent, e. g., alcohol or acetone, and recovering the salt formed, e. g., by evaporating the solvent. The acids utilizable for preparation of such salts comprise, inter alia, hydrochloric, sulfuric, boric tartaric, lactic, citric, and malic acids.

The novel intermediate of this invention may be prepared by nuclear halogenation of amines of the formula

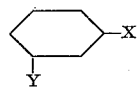

wherein R represents akyl, preferably lower alkyl. The halogenated amines may be recovered in the form of, or converted into, acid-addition salts (e. g., the hydrochloride) in the usual manner.

The following examples are illustrative of the invention:

EXAMPLE 1

*2-butoxy-5-(2',4'-diamino-phenylazo)-pyridine*

2 g. of 2-butoxy-5-amino-pyridine is dissolved in 25 cc. of water and 5 cc. of concentrated hydrochloric acid, and diazotization is effected at —5° to 0° C. with 0.5 g. of sodium nitrite dissolved in 10 cc. of water, 1 g. of urea being finally added to destroy any excess of nitrous acid. Then a solution of 1.2 g. of M-phenylene-diamine hydrochloride in 10 cc. of water is added to the solution of the diazonium salt at —5° C., and the coupling reaction is allowed to proceed at 5° C. for twelve hours. Precipitation is effected by making the reaction mixture ammoniacal, and the precipitate is collected, washed with water, and dried in a vacuum to yield a dark red azo base having the formula $C_{15}H_{19}N_5O$.

The hydrochloride ($C_{15}H_{20}N_5OCl$) may be obtained by adding the theoretical quantity of hydrochloric acid to an alcoholic solution of the base, and then evaporating the solution to dryness; and the sulfate may be obtained by dissolving the base in acetone, adding normal sulfuric acid, and evaporating the solution to dryness.

EXAMPLE 2

*2-butoxy-4-chloro-5-(2',4-diamino-phenylazo)-pyridine*

1.4 g. of 2-butoxy-5-amino-pyridine dihydrochloride is suspended in 75 cc. of glacial acetic acid, and chlorination is effected by stirring at 20° C. with 2 g. sulfuryl chloride dissolved in 10 cc. of glacial acetic acid; the mixture is stirred for two hours, and the material in suspension is collected by filtration, washed with glacial acetic acid, and dried in a vacuum. The intermediate, 2-butoxy-4-chloro-5-amino-pyridine dihydrochloride, is obtained as a grayish-white crystalline substance melting at 260–262° C.

1.6 g. of 2-butoxy-4-chloro-5-amino-pyridine dihydrochloride is dissolved in 20 cc. of water, to which is added 4 cc. of concentrated hydrochloric acid, and diazotization is effected at approximately 0° C. with 0.5 g. of sodium nitrite dissolved in 10 cc. of water, 1 g. of urea being finally added to destroy any excess of nitrous acid. Then a solution of 0.72 g. of m-phenylenediamine hydrochloride in 10 cc. of water is added to the solution of the diazonium salt, and the coupling reaction is allowed to proceed at 5° C. for two hours, and at 25° C. for twelve hours. Precipitation is effected by making the reaction mixture ammoniacal, and the precipitate is collected, washed with water, and dried in a vacuum to yield an azo base having the formula $C_{15}H_{18}N_5OCl$.

The hydrochloride ($C_{15}H_{19}N_5OCl_2$) may be obtained by adding the base to a solution of the theoretical quantity of hydrochloric acid and evaporating to dryness. The base may be similarly converted into other acid-addition salts, inter alia, the sulphate, borate, tartrate, or citrate.

Example 3

2-butoxy-4-bromo-5-amino-pyridine 5 g. of 2-butoxy-5-acetamino-pyridine is dissolved in 25 cc. of acetic acid, and bromination is effected by adding a solution of 3.9 g. bromine in 5 cc. of acetic acid dropwise, with stirring, at 17° C.; the acetic acid is then removed by vacuum distillation, and the residue (2-butoxy-4-bromo-5-acetamino-pyridine) is hydrolyzed by boiling with 18% hydrochloric acid. The reaction mixture is then cooled, and 2-butoxy-4-bromo-5-amino-pyridine dihydrochloride precipitates as a crystalline substance, which is collected, washed, and dried. Alkalinization of an aqueous solution of the dihydrochloride yields the corresponding base.

Example 4

2-ethoxy-4-chloro-5-amino-pyridine 3.45 g. of 2-ethoxy-5-amino-pyridine is dissolved in 25 cc. of acetic acid, and chlorination is effected by stirring at 17° C. with a solution of 3.5 g. of sulfuryl chloride in 10 cc. of acetic acid; the acetic acid is then removed by vacuum distillation, and the residue is dissolved in water and alkalinized, to yield 2-ethoxy-4-chloro-5-amino pyridine.

Example 5

2-ethoxy-4-bromo-5-amino-pyridine 4.5 g. of 2-ethoxy-5-acetamino-pyridine is dissolved in 25 cc. of acetic acid, and bromination is effected by adding a solution of 4 g. bromine in 5 cc. of acetic acid dropwise, with stirring, at 17° C.; the acetic acid is then removed by vacuum distillation, and the residue (2-ethoxy-4-bromo-5-acetamino-pyridine) is hydrolyzed by boiling with 18% hydrochloric acid. The reaction mixture is then cooled, and 2-ethoxy-4-bromo-5-amino-pyridine dihydrochloride precipitates as a crystalline substance, which is collected, washed, and dried. Alkalinization of an aqueous solution of the dihydrochloride yields the corresponding base.

Example 6

2-isopropoxy-4-chloro-5-amino-pyridine 5 g. of 2-isopropoxy-5-amino-pyridine is dissolved in 25 cc. of acetic acid, and chlorination is effected by adding a solution of 4.5 g. of sulfuryl chloride in 10 cc. of acetic acid dropwise, with stirring, at 17° C.; the acetic acid is then removed by vacuum distillation, and the residue (2-isopropoxy-4-chloro-5-amino-pyridine dihydrochloride) precipitates as a crystalline substance which is collected, washed, and dried. Alkalinization of an aqueous solution of the dihydrochloride yields the corresponding base.

Following the procedure detailed in Examples 2 to 6 inclusive, other intermediates may be obtained by variation of the 2-alkoxy-5-amino-pyridine used and the halogen introduced.

The invention may be variously otherwise embodied within the scope of the appended claims.

I claim:

1. A compound of the group consisting of: azo bases of the general formula

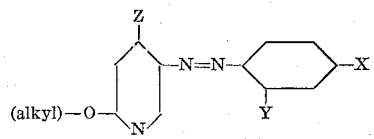

wherein X represents a member of the group consisting of hydroxy and amino; Y represents a member of the group consisting of hydrogen, hydroxy, alkyl, aryl, alkoxy, and amino, and Z represents a member of the group consisting of hydrogen and halogen; and acid-addition salts of these azo bases.

2. An acid-addition salt of an azo base of the general formula

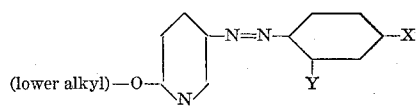

wherein X represents a member of the group consisting of hydroxy and amino, and Y represents a member of the group consisting of hydrogen, hydroxy, alkyl, aryl, alkoxy, and amino.

3. An acid-addition salt of an azo base of the general formula

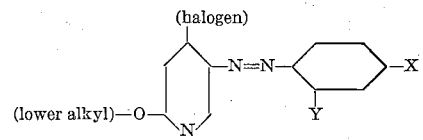

wherein X represents a member of the group consisting of hydroxy and amino, and Y represents a member of the group consisting of hydrogen, hydroxy, alkyl, aryl, alkoxy, and amino.

4. An acid-addition salt of an azo base of the general formula

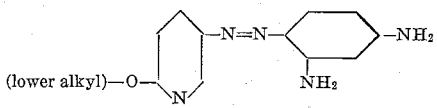

5. An acid-addition salt of an azo base of the general formula

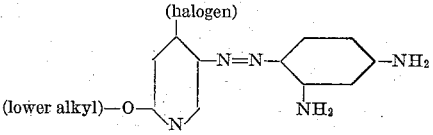

6. An acid-addition salt of 2-butoxy-5-(2',4'-diamino-phenylazo)-pyridine.

7. An acid-addition salt of 2-butoxy-4-chloro-5-(2',4'-diamino-phenylazo)-pyridine.

8. The process which comprises diazotizing an amine of the general formula

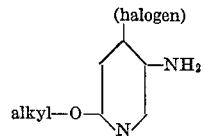

and coupling the diazonium salt obtained with a compound of the general formula

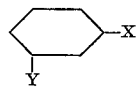

wherein X represents a member of the group consisting of hydroxy and amino, and Y represents a member of the group consisting of hydrogen, hydroxy, alkyl, aryl, alkoxy, and amino.

9. The process which comprises diazotizing an amine of the general formula

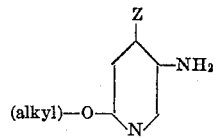

wherein Z represents a member of the group consisting of hydrogen and halogen, and coupling the diazonium salt obtained with a compound of the general formula

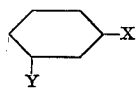

wherein X represents a member of the group consisting of hydroxy and amino, and Y represents a member of the group consisting of hydrogen, hydroxy, alkyl, aryl, alkoxy, and amino.

WILLIAM BRAKER.